United States Patent [19]

Lopata

[11] 4,025,176
[45] May 24, 1977

[54] GRAPHIC COMMUNICATION SYSTEM

[76] Inventor: Ira L. Lopata, 35 Sutton Place, New York, N.Y. 10022

[22] Filed: May 19, 1975

[21] Appl. No.: 578,680

[52] U.S. Cl. .............................................. 353/26 A
[51] Int. Cl.² .................. G03B 21/10; G03B 25/00
[58] Field of Search ................ 353/25, 26 R, 26 A, 353/27 R, 27 A, 120, 121, 122; 352/78 C; 340/172.5; 40/78.05, 68.4; 209/80.5; 250/570; 355/41

[56] References Cited

UNITED STATES PATENTS

| | | | |
|---|---|---|---|
| 3,164,059 | 1/1965 | Turrentine | 353/26 A |
| 3,243,780 | 3/1966 | Bendick et al. | 40/78.05 |
| 3,290,987 | 12/1966 | James | 353/26 A |
| 3,456,817 | 7/1969 | Irazoqui | 214/16 AR |
| 3,704,451 | 11/1972 | Pearson | 353/25 |
| 3,732,546 | 5/1973 | Ronkin | 353/26 A |
| 3,768,897 | 10/1973 | Spani | 353/26 |
| 3,781,809 | 12/1975 | Murakoshi | 353/27 A |
| 3,792,440 | 2/1974 | Murakoshi | 353/25 |
| 3,800,942 | 4/1974 | Hirata | 353/25 |
| 3,804,498 | 4/1974 | Lopata | 352/78 R |
| 3,895,865 | 7/1975 | Kaufman | 353/26 |

OTHER PUBLICATIONS

Electronics, 6/29/62, pp. 46–62, entitled "System Considerations."

*Primary Examiner*—Harry N. Haroian
*Attorney, Agent, or Firm*—Norman N. Popper

[57] ABSTRACT

This relates to a high capacity, high speed random access filing system for graphic data. Graphic data on microfilm is placed in cartridges and the cartridges stored in a storage drum. The location of each cartridge is defined by a four digit address and each image frame is further defined by a four digit address. A source document is accessed by entering the combined eight digit address via a keyboard. The corresponding cartridge is automatically retrieved and the image frame corresponding to the requisitioned document is located and projected onto a display screen. A hard copy may then be produced if desired. The above system may be combined with an electronic memory search and data capture equipment for originating, maintaining, and updating stored graphical data.

16 Claims, 7 Drawing Figures

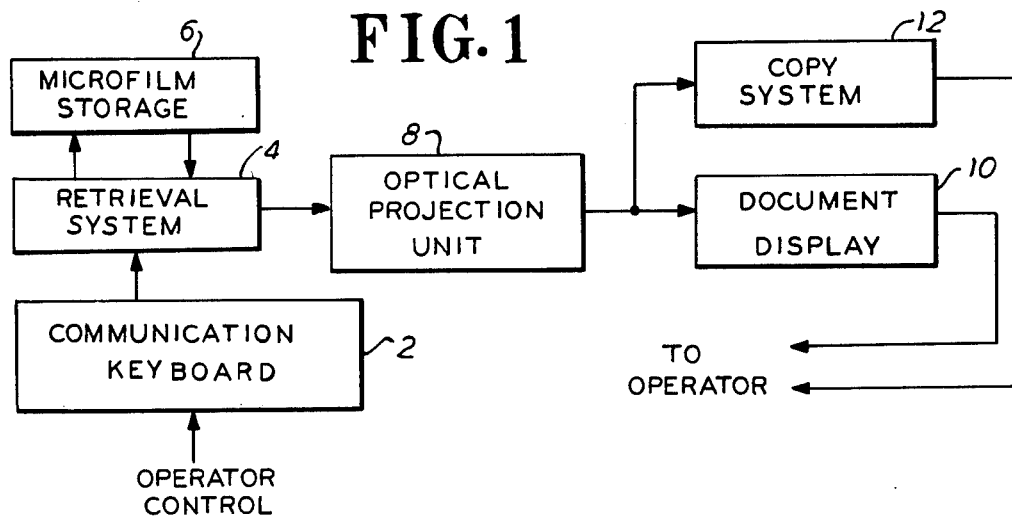
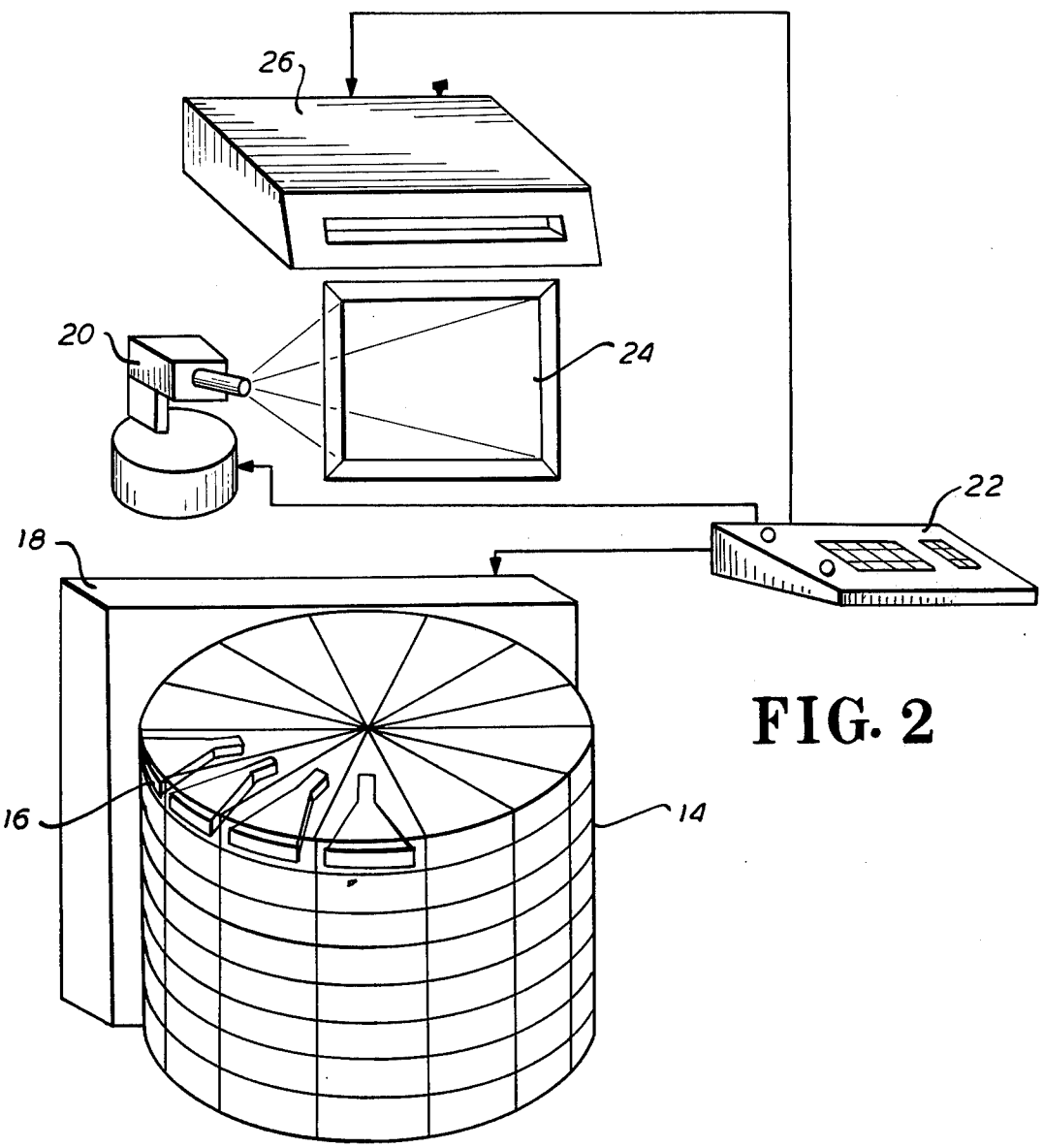

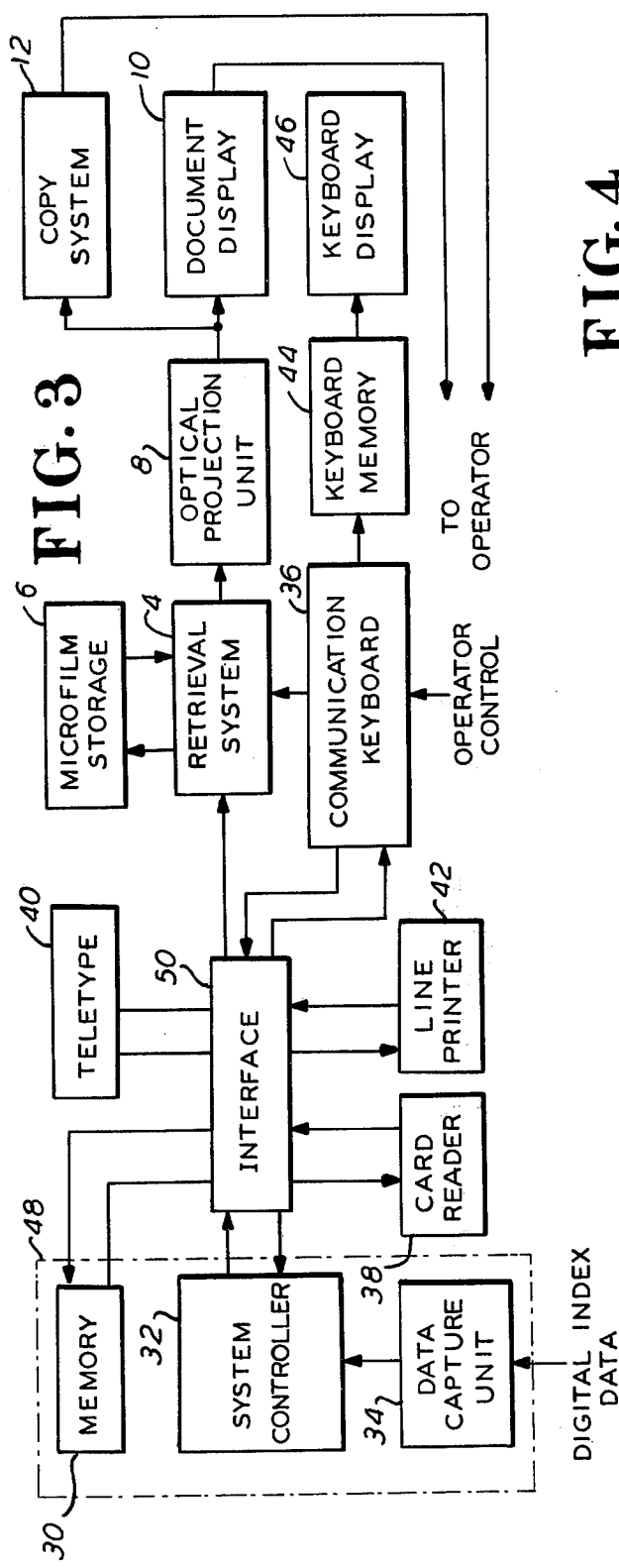

GRAPHIC COMMUNICATION SYSTEM

BACKGROUND OF THE INVENTION

This invention relates generally to an automatic filing system and, more particularly, to a system for automatically storing, accessing and retrieving graphic data.

The rapid growth of government and industry has been accompanied by the necessarily burdensome task of processing, filing and retrieving an ever-increasing volume of printed, written and pictorial documents. The full impact of this burden is more clearly understood when one considers the number of documents necessary to maintain personnel records, tax data invoices, credit card receipts, charge account purchase receipts, etc. In order to meet this ever-increasing challenge, industry and government have been forced to maintain large clerical staffs, whose task it is to process, file and retrieve "paper." Since the processing, filing and retrieving is, for the most part, accomplished manually, there invariably results situations in which important documents are lost or misfiled. In addition to the cost of maintaining such large clerical staffs, there is also to be considered the additional expense of maintaining large numbers of file cabinets which occupy a great deal of valuable space. Clearly, the key to increased efficiency in clerical productivity lies in the use of a fully automated graphic data storage and retrieval system.

Past attempts to provide such a system have been meager. The practice of recording graphic data on microfilm, for example, is well known. Further, many devices for displaying information recorded on microfilm have been provided. However, when using many of these devices, it is necessary to first select the particular reel of film on which the desired document is recorded, thread the reel of microfilm in a projector or reading machine and transport all of the unwanted film past the projector until the desired portion of the film is reached. Clearly, this approach is still, for the most part, a manual solution to the problem.

The microfilm is generally optically projected by pulling the film strip off the reel or out of a cassette cartridge which houses the reel, leading the film to a projection station and projecting a portion or frame of the film after it has left the cassette. After the chosen frame is located and projected by withdrawing the film from the cassette, the film is rewound into the cassette. The handling of the film may clearly impart smudges and scratches to the film and permits the deposition of dust and dirt particles thereon.

As alluded to previously, the acts of selecting the proper cassette, mounting it in a projector, unspooling it to the proper frame, projecting that frame, rewinding the film back into the cassette and removing the cassette to its normal storage position, are all acts which are time-consuming and vastly increase the cost of retrieving information.

U.S. Pat. Nos. 3,456,817 and 3,804,498, issued July 29, 1969 and Apr. 16, 1974 respectively, and assigned to the assignee of the present invention, make possible a system having the capability of automatically storing, accessing and retrieving an almost unlimited amount of graphical data (millions of written, printed or pictorial pages). The first of the above cited patents relates to a random access storage and retrieval sytem. The system comprises a plurality of circular supports, each adapted to carry a multiplicity of microfilm cassettes arranged sequentially around the periphery of the supports. A retrieval path is defined by an opening or gap in each of the separate supports, which gaps are normally positioned in alignment to define a retrieval path. After a particular microfilm cassette has been selected, the corresponding support is moved until the preselected cassette is positioned in the retrieval path. A transport device then carries the selected cassette to a position of access.

The second of the above cited patents relates to a cassette for microfilm particularly adapted for use in the above described random access storage and retrieval system. The microfilm is located in a portion of the cassette housing which is highly resistant to penetration by dust and dirt. The housing is provided with unspooling means which does not require handling of the cassette or the film. The film is projected while it is still located within the housing, insuring minimal stress on the film at the point of projection and accurate positioning of the desired image frame for projection.

SUMMARY OF THE INVENTION

It is an object of the present invention to provide an automatic filing system capable of storing and automatically retrieving graphical data.

It is a further object of the invention that the retrieval be accomplished in a matter of seconds.

It is a further object of the invention that the location of each document image be defined by a source document address which is comprised of information pertaining to the location of a particular microfilm cassette and a particular image frame contained therein.

It is a further object of the invention that the source document address become an integral part of each image frame.

It is a further object of the invention that the search for stored graphic data be combined with an electronic memory search.

It is a further object of the invention that the system be capable of scanning the stored data using various parameters, e.g., partial description, last name, data, distinguishing features, etc.

It is a further object of the invention that the various parameters be stored in memory as digital index data and that all such data, corresponding to a particular image frame, be matched with the image frame's source document address.

It is a further object of the invention that the automatic filing system have an in-house capability of initiating, producing, maintaining and updating information for storage and retrieval.

It is a further object of the invention that the retrieved graphic data be displayed for visual inspection.

It is a further object of the invention that the automatic filing system be capable of providing a hard copy of the retrieved data.

It is a further object of the invention that the display graphic data show and the hard copy contain the source document address.

It is a further object of the invention that the memory be compatible with standard peripheral devices such as punched card readers and teletypewriters.

It is a further object of the invention that the system readily accept computer output microfilm (COM) generated graphics and be capable of extracting, from the magnetically printed image, all required index and graphic frame identification for automatic COM display.

It is a further object of the invention that obsolete data be appropriately designated or deleted.

Finally, it is a further object of the invention that the stored data be inaccessible to unauthorized personnel.

According to a broad aspect of the invention, there is provided a high speed storage, retrieval and display system for graphic data wherein source documents are disposed on strips of microfilm containing along the lengths thereof a plurality of image frames, and wherein each of said strips is contained in a microfilm cartridge, comprising: means for storing a plurality of said microfilm cartridges; a display station; retrieving means for automatically transporting a particular one of said plurality of cartridges to said display station; means for locating a particular one of said plurality of image frames in the retrieved cartridge; and means for displaying on a display screen the contents of said particular one of said plurality of image frames, said contents representing a desired source document.

The above and other objects of the present invention will be more clearly understood from the following detailed description taken in conjunction with the accompanying drawings in which:

BRIEF DESCRIPTION OF THE DRAWINGS

FIG. 1 is a block diagram of an automatic filing system according to the present invention;

FIG. 2 illustrates further the automatic filing system of FIG. 1;

FIG. 3 is a block diagram of the automatic filing system of FIGS. 1 and 2 further including a memory unit;

FIG. 4 illustrates the layout of a communications keyboard for use with the filing system of FIG. 3;

DESCRIPTION OF THE PREFERRED EMBODIMENTS

Figure 5:
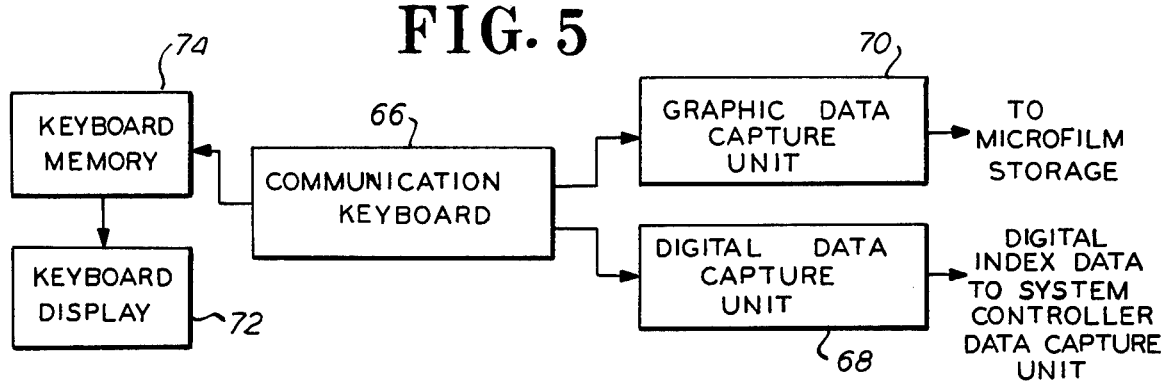
FIG. 5 is a block diagram of a data capture center for use with the automatic filing system shown in FIG. 3.

One embodiment of an automatic filing system according to the present invention is functionally shown in FIG. 1. An automatic retrieval system 4 of the type shown and described in U.S. Pat. No. 3,456,817, is activated by control signals from communication keyboard 2. Retrieval system 4 searches microfilm storage unit 6 until the desired data is located. Retrieval system 4 then causes said preselected information to be made available to an optical projection unit 8 whereby the desired document is displayed in document display unit 10. If desired, a copying unit 12 may also be coupled to the output of the optical projection unit 8 to provide the operator with a hard copy of the desired document.

FIG. 2 illustrates the embodiment shown in FIG. 1 in somewhat more detail. Referring to FIG. 2, a cartridge storage drum 14 comprises 20 spoked hubs, each of which contains 15 microfilm cartridges of the type shown and described in U.S. Pat. No. 3,804,498. Each cartridge 16 is maintained in separate pie-shaped sectors, and each sector is assigned a permanent address which, for the purpose of accessing and retrieval, defines the cartridge location. Since the above described storage drum may contain 300 cartridges, a four-digit address is reserved for each sector or cartridge; two digits identify which of the spoked hubs contains the desired cartridge, and the remaining two digits define the position of the desired cartridge on the particular hub. It is to be noted that since each of the cartridges described in U.S. Pat. No. 3,804,498 may contain up to 3500 image frames, cartridge storage drum 14 has the capability of storing approximately 1 million pages of pictorial, printed or written data.

The selected hub rotates in a horizontal plane and presents the preselected cartridge to a transport index position. When the selected cartridge appears at the index position, the preselected cartridge is transported by film transport system 18 to optical projection system 20. The vertical transport mechanism carries the cartridge upward and automatically mounts it on a keyed shaft of a rewind motor.

In addition to the four-digit address defining cartridge location entered via keyboard 22, a further four-digit address is employed to identify a particular image frame in the particular cartridge which contains the desired graphic data. The roll of microfilm in the cassette is engaged by a wind-up reel mechanism, and the film is advanced to the proper image frame as designated in the four-digit image frame address. An image frame counting system counts index marks under each frame until the proper frame is located and its contents displayed on display screen 24 via optical projection system 20.

A frame location system suitable for this purpose is described in U.S. Pat. No. 3,934,241 assigned to the assignee of the present invention. A discriminator circuit of the type described in U.S. Pat. No. 3,872,322 may be used in conjunction with the above referenced frame location system. The discriminator circuit converts the irregular electrical signal output of a photocell into a regular waveform to provide accurate frame counting.

The automatic filing system may also include a hard copy unit 26, which is operated by depression of an appropriate key on keyboard 22. The hard copy is produced in conjunction with the optical projection system 20 and display screen 24. Therefore, by merely pressing an appropriate key on keyboard 22, the operator, after viewing the document on display screen 24, can be provided with a hard copy of the document.

Upon completion of the viewing sequence, the film is rewound into the cartridge and returned to its original sector.

Optical projection system 20 may consist of a high intensity light source and a lens and mirror system that projects the image onto a translucent glass viewing screen permitting the operator to view the image frame of the source document. Many systems of this nature are well known and commercially available. By providing for rotation of a mirror assembly by a reversible motor, the image may be rotated by 90° in either direction.

Also, the copy unit 26 may be any commercially available self-contained unit which produces a hard copy of the displayed source document.

It should now be clear that each source document may be located by the key depression of an 8-bit address which will hereinafter be referred to as the source document address. As stated previously, two bits define the hub on which a particular cartridge is located, two bits indicate which sector on the particular hub contains the required cartridge, and the remaining four bits indicate which image frame contains the desired source document. To initiate a search and retrieve routine, the operator merely enters the eight-bit source document address via keyboard 22.

It is to be especially noted that the inventive filing system contemplates fixing the eight-digit source document address on each image frame such that when displayed, the eight-digit address will appear on display screen 24 and on any hard copies that are subsequently produced. This will substantially eliminate the possibility of retrieving incorrect data due to typographical errors when making a source document inquiry.

A possible keyboard arrangement for use with the above described automatic filing system would contain 10 numeric keys for entering the source document address. An execute key would activate the automatic retrieval system. A clear key would clear the keyboard of all previous entries, while a frame clear key would clear the keyboard of the four-digit image frame address, while retaining the four-digit cartridge address. Step plus and step minus keys could be provided for advancing or retracting the film one frame. A copy key is depressed when a hard copy is desired. Further, focus and exposure controls for the optical projection system 20 and hard copy unit 26 respectively would be provided.

The above described automatic filing system has a high density storage capability, i.e., up to 1 million letter-size pages utilizing conventional 16mm roll film reels within 300 cartridges, each of which may contain up to 3500 pages. The automatic filing system, under operator keyboard control, provides a fully automated retrieval, display and hard copy of a desired source document. To initiate a search and retrieve routine, the operator merely enters the above described eight-digit source document address via the keyboard. Depression of a further key will initiate automatic source document retrieval. The source document is then displayed and, at any time subsequent thereto, a hard copy can be provided by further key activation.

Control circuits for the above described automatic filing system are not shown herein since many different circuits may be employed, suitable circuits being obvious to those skilled in the art. The invention resides in the arrangement so far described and does not reside in any particular control circuitry.

As shown in FIG. 3, the above described automatic filing system may be further combined with a memory unit 48 comprising a system controller 32, a memory 30, for example a magnetic disk memory, and a data capture unit 34. Memory unit 48 accepts digital index data, i.e., digital data describing source documents, permits updating of this data, and conducts a search of memory 30 for a source document address in the automatic retrieval of a source document.

System controller 32 controls the mode of operation of memory unit 48, i.e., sorting, merging, memory dump, data capture (to be described below), etc. and may include a processor having a core memory, a read only memory and logic circuitry for controlling input-/output functions and peripheral devices. Further, it includes complete file program maintenance and report generation.

Data capture unit 34 may be a magnetic tape cassette recorder operating in the read mode to enter digital index data into memory 30 via system controller 32. Digital index data, to be more fully described below, may consist of key descriptors (name, data, etc.). When a key descriptor inquiry is made via communication keyboard 36, a search of memory 30 is performed and a source location address displayed on keyboard display 46.

An input/output interface 50 provides coupling between system controller 32 and communications keyboard 36, memory 30, and other standard and optional peripheral units, such as a punched card reader 38, teletype 40 and/or line printer 42. It should be noted that the system controller 32 and memory 30 may be remotely located with respect to the rest of the arrangement shown in FIG. 3.

For the sake of convenience, the arrangement comprising keyboard 36, retrieval system 4, microfilm storage 6, projection unit 3, copy system 12, document display 10, and keyboard memory and display 44 and 46 will hereinafter be referred to as a terminal. Referring again to FIG. 3, each memory unit may have the capability of accommodating a plurality of terminals which may or may not be remotely located. The terminals may be multiplexed via hard wire or voice grade unprocessed telephone lines.

System controller 32 and memory 30 search, record, retain, sort and merge retrieval descriptors and source document addresses. To automatically retrieve a source document from the storage drum of a terminal coupled to a memory unit, a block of up to 32 alphanumeric characters is prepared for each storage document. This block is referred to as digital index data and consists of 4 numeric characters defining the image frame address, 4 numeric characters defining the cartridge address, 1 alpha character defining the file label, 1 alpha character defining the edit instruction, and up to 22 alphanumeric characters describing key descriptors.

The memory unit 48 is adaptable to existing data routines, or new routines which may be organized for specific applications. Initially, the source documents must be analyzed and a determination made as to which of a plurality of types or categories of files the source document shall be placed. Each type of file has an associated file label used to access that particular file.

For example, the following six files may be constructed: archival, FIFO, FIFO with Boolean, Boolean, LIFO, and LIFO with Boolean.

The archival file may contain a collection of documents, each of which is different but having one characteristic in common, i.e., name, purchase order numbers, etc.

The FIFO file (first in - first out) contains documents which are accessed in the order of their entry. The FIFO with Boolean file may contain a combined list of the date of first entry of the documents arranged for two or more characteristics.

The Boolean list or file contains documents identified by key descriptors, such as subject, color, age, etc. The lists are compared by a deductive logical system which matches characteristics.

The LIFO file contains documents in which the last entered are the first retrieved. For example, this file would contain correspondence by data. The LIFO with Boolean file contains a combined list of the date of entry arranged for two or more characteristics.

As stated previously, of the 32 alphanumeric characters prepared for each source document, 22 are reserved for key descriptors. Key descriptors describe the source document and may include a proper name: Smith, a purchase order number, an engineering drawing number, a code number, or any alphanumeric combination not exceeding 22 characters. Several key descriptors may be assigned to a single source document for rapid retrieval, in which case the eight-bit source document address will remain the same while each key descriptor may be entered into a separate file.

Edit instructions, defined by one alpha bit in the above mentioned 32 alphanumeric block, are instructions to system controller 32 and memory 30 regarding the processing of the digital index data being entered and where it is to be located in memory. The contents of a file may be rearranged within the memory to contain the new digital index data. By way of example, the following six edit instructions may be used: ADD — for adding a source document address or key descriptor. ERASE — for erasing a source document address or key descriptor. This instruction is used to correct errors. VOID — this instruction voids a source location address or key descriptor. These are then placed into a "void" file. OBSOLETE — when this instruction is employed, the source location address is flagged obsolete and the address is placed in an obsolete file. INCLUDE — this instruction is used to include a source location address at the end of a display list, which is displayed on the display panel. It is to be noted that the INCLUDE, ERASE, VOID, and OBSOLETE instructions may be coupled with a page option in which the instruction is carried out after a specified page in the display list. Finally, a REPLACE instruction deletes an old source document address in the list and substitutes therefor a new one.

Since a terminal has now been combined with a memory unit, an expanded keyboard arrangement is required for communicating with system controller 32 and memory 30. One example shown in FIG. 4 comprises a standard alphanumeric keyboard 52, a display panel 54, a special function keyboard 56, a mode control switch 58, a dry copy control 60, and an integral memory for temporary data storage (not shown in FIG. 4, but shown in FIG. 3 as 44).

The keyboard controls the digital input to the system. The speed of this input is limited only by the speed of the operator. The standard alphanumeric keyboard contains two special function keys. The first special function key, a clear key 62, clears the keyboard of all previous entries. The second special function key, an execute key 64, initiates interrogation of the memory based upon the entry of the above described 32 bit code. The search response will be displayed on display panel 54.

The special function keyboard 56 controls the graphic output of the system. A copy key controls the hard copy unit and provides for one copy of the displayed image frame upon depression. A focus key provides continuous focus action of the optical projection unit. A synchronization key permits synchronization of the displayed image with the displayed source document address. A scan key initiates a continuous scan of the displayed image group as long as the key is depressed. A step key steps the displayed image one frame at a time. An image key rotates the displayed image 90° in either direction. An execute key initiates the automatic return of the page image frame as specified by the displayed source location address. Finally, a clear key 62 ends inquiry and causes the microfilm to be rewound and the cartridge returned to its graphic storage area.

Display 54 is a 32 character display panel. Each character, entered through the alphanumeric keyboard 52, is displayed on this panel for visual verification before entry into the system. In response to an interrogation, the system will display the source location address from the memory on display panel 54.

The copy control 52 provides exposure control of the hard copy unit as required.

The integral memory, not shown in FIG. 4 but shown as 44 in FIG. 3, is an integral part of the keyboard and serves as temporary storage for the source document address or key descriptors before entry into the system during interrogation. This allows for vertification prior to entry and substantially reduces operator error.

FIG. 5 is a block diagram of a data capture center which may be used in conjunction with the automatic filing system shown in FIG. 3. The data capture system includes an alphanumeric keyboard 66, a digital data capture unit 68, and a graphic data capture unit 70. The data capture center is employed to simultaneously capture graphic and digital data for subsequent entry into the terminal and memory unit, thereby providing in-house capability of initiating, producing, maintaining and rapidly updating information for storage and retrieval.

Keyboard 66 is similar to that which is shown in FIG. 4. It also contains an integral character display 72 and a memory 74 which provides a reread/compare feature.

Figure 6:
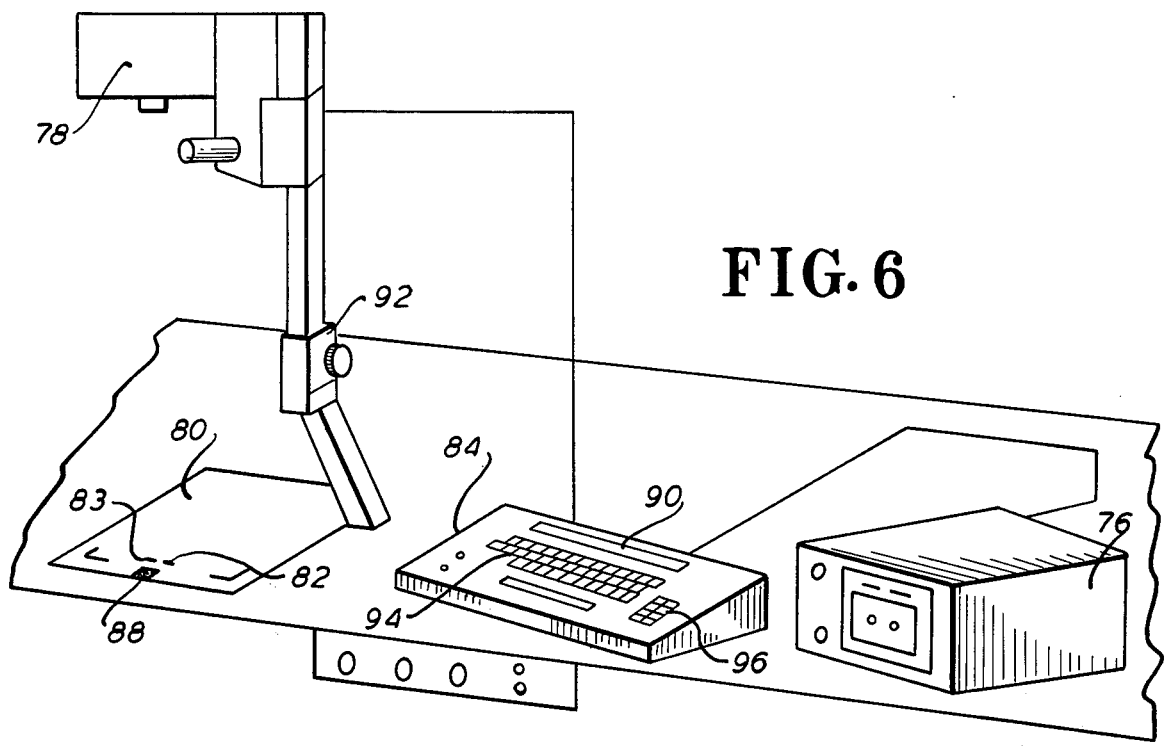
FIGS. 6 and 7 illustrate further and in more detail the data capture center of FIG. 5.
Figure 7:
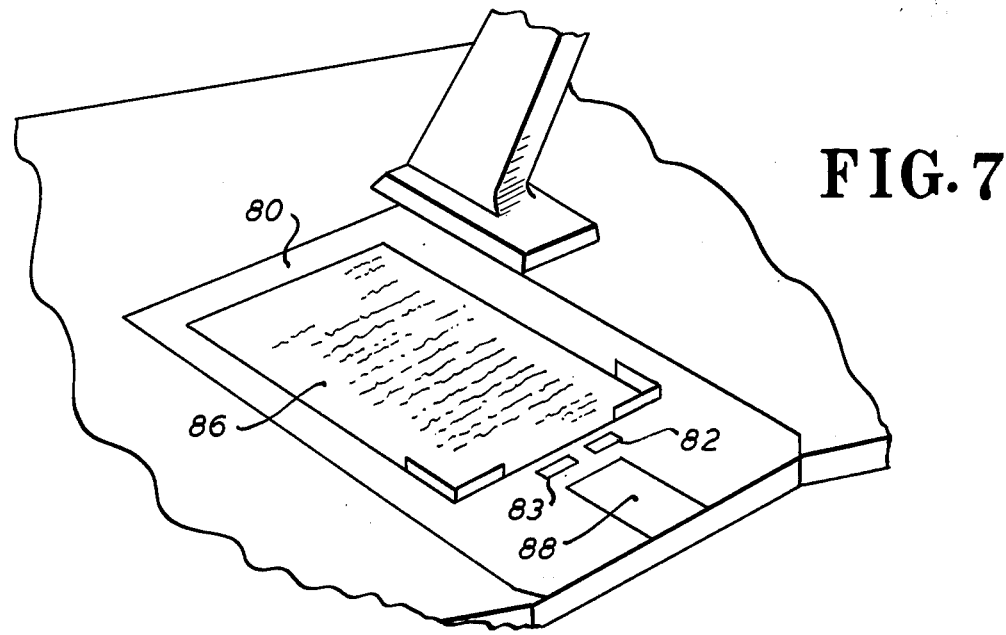

Referring to FIGS. 6 and 7, the digital data capture unit may comprise a magnetic tape cassette recorder 76 for recording descriptive data (retrieval parameters) of source documents entered via keyboard 34. A source document address of each page is automatically added to the entered data.

The graphic data capture unit comprises a planetary camera 78 for recording, on 16mm, film written printed or pictorial information and a source document address. Page platen 80 provides a target area for capturing graphic data. Mounted directly below the platen are counters 82 and 83 by means of which the source document address is automatically recorded on each filmed page.

FIG. 7 illustrates the graphic target area in somewhat more detail. A source document 86 is shown positioned on the page platen 80. Numeric counters 82 and 83 contain the image frame address and cartridge address as described hereinabove. A darkened area 88 is employed to provide an index "blip" mark on each image frame. This is used for frame-counting purposes according to any one of a number of known frame-counting techniques.

It should again be noted that each page filmed is referenced to a particular source document address. This feature is carried through the entire system and virtually eliminates the possibility of error. Each time an operator retrieves a document, its source document address, and no other, should appear on the display image and hard copy.

Written, printed or pictorial source documents are placed on the page platen. Utilizing keyboard 84, the operator keys in descriptive data (retrieval parameters), of the page and verifies the entered data on the keyboard display 90. The source document page address, which corresponds to the readings of numeric counters 82 and 83, is automatically added and the descriptive data, including the source document address, is displayed and again verified. Thereupon the camera automatically records the source document and the source document address.

The processed microfilm may be retained as a master and an inexpensive duplicate made. The duplicate may then be inserted into a cartridge of the type described in U.S. Pat. No. 3,804,498 and finally placed in cartridge drum 14 (FIG. 2) of the terminal.

The tape cassette of the digital data capture unit, which contains the descriptive data and the source document address of each source document, is entered into memory unit 48 through digital data capture unit 68 and data capture unit 34.

Initially, the image frame and cartridge address counters 82 and 83 must be manually set as required. Subsequently, these counters are controlled by keyboard 84. As stated above, located below the counters is a permanent rectangular index mark or blip which is optically read and used to control the film roll transport mechanism during the retrieval operation. Therefore, the photographed image contains the source document, the image frame address, the cartridge address and the index mark.

Planetary camera 78 may contain a built-in exposure meter and a fixed lens opening. Photographs are then taken in ambient light by controlling the time of exposure. The camera is mounted on an adjustable stand 92 for adjusting the height of the camera from the source document.

Many features can be easily built into the graphic data capture unit. These include an end of film alarm, an automatic film cutter, a film advance to provide for continuous film advance, and exposure control.

Keyboard 84 is similar to the terminal keyboard shown in FIG. 4. In the data capture mode, the keyboard controls the digital data capture unit 68, image frame counter 82, cartridge address counter 83 and a graphic data capture unit 70. The keyboard comprises an alphanumeric keyboard 94, a display panel 90, a special function keyboard 96, and an integral memory for temporary data storage 74. The depression of a clear key clears the keyboard of all previous entries. Depression of an execute key enters the source document address (stored within the keyboard memory 74), and the displayed edit, file label and key descriptor into digital data capture unit 68. The tape cassette contained within the digital data capture unit is automatically placed into a read mode, automatically rewinds, and reads the last data block for display in keyboard display 90 for visual verification. After verification, the next entry is made by the operator.

Using the magnetic tape cassette recorder of digital data capture unit 68, digital index data can be entered into memory 30.

An additional feature of the above described automatic filing system is its compatibility with computer output microfilm (COM). The standard tape output from a computer system is a continuous recording of data with no page start or page end marks. However, the automatic filing system according to the invention requires that each page of data be identified with one or more key descriptors. Also, it is desirable to assign a souce document address.

A special operating program can easily be prepared which will accept the original tape and prepare a tape containing key descriptors for each page of data for entry into the system memory.

The original tape can be processed in a normal manner to produce a COM film roll of image frames having an index mark for each page. The film can then be placed within a cartridge and entered into the terminal drum storage.

The system above described is a totally integrated management information system which meets the urgent requirement of eliminating evermounting and wasteful paper files, while at the same time offering instant access to the information contained. A powerful electronic interrogation capability, using a plurality of parameters, is provided. The system responds with an almost instantaneous status report of the contents of the memory relative to the particular inquiry. Further, the system automatically retrieves, displays, and hardcopies any one or any series of pages in a matter of seconds.

The system offers total file integrity. No documents or records can be lost, misfiled or forgotten since the operator does not handle or come into direct contact with any of the source material.

The system can replace hundreds of file cabinets, thereby making the valuable floor space they occupy available for other purposes. Since the amount of paper has been drastically reduced, the number of clerical personnel normally required to handle the vast quantity of paper is reduced.

The system offers on-line access to potentially millions of pages of written, printed, pictorial or COM data. Original documents are described and captured simultaneously both digitally and graphically. During capture, the source document address is automatically assigned. This address is maintained throughout the system and will appear on the display screen or hard copy when the particular source document is accessed and retrieved.

While the principles of the invention have been described above in connection with specific apparatus, it is to be clearly understood that this description is made only by way of example and not as a limitation on the scope of the invention.

I claim:

1. A high-speed storage, retrieval and display system for graphic data comprising:

source documents disposed on strips of microfilm containing along the lengths thereof a plurality of image frames;

a plurality of microfilm cartridges for housing said strips containing said image frames, wherein the contents of each of said image frames comprises a source document and a source document address in graphic form, said source document address defining the location of its corresponding image frame within said system;

a plurality of rotatable supports, each of which is divided into sectors and each sector having disposed therein one of said plurality of cartridges, each support having assigned thereto a first address, each sector having assigned thereto a second address and each of said plurality of image frames having assigned thereto a third address, the combination of said first, second and third addresses forming said source document address which defines the location of a particular one of said plurality of image frames;

addressing means for inserting into said system said source document address, said addressing means comprising:

a communication keyboard through which said first, second and third addresses are entered; and an integral memory and display associated with said communication keyboard for verifying said first, second and third addresses prior to entry into the system;

a display station;

retrieving means responsive to said source document address for automatically transporting a particular one of said plurality of cartridges to said display station;

means for locating a particular one of said plurality of image frames in the received cartridge, said means for locating responsive to said source document address;

means for displaying at said display station on a display screen the contents of said particular one of said plurality of image frames, said contents representing the desired source document and including its source document address;

a memory for storing digital index data with said first, second and third addresses;

a controller coupled to said memory for controlling the operation thereof and the entry of said digital index data, said memory accessed from said keyboard through said controller; and a data capture unit coupled to said controller for supplying said memory with said digital data.

2. A high speed storage, retrieval and display system according to claim 1 wherein said memory is a magnetic disk memory.

3. A high speed storage, retrieval and display system according to claim 2 wherein said data capture unit is a magnetic tape recorder operating in the read mode.

4. A high speed storage, retrieval and display system according to claim 1 further comprising a teletypewriter coupled to said controller.

5. A high speed storage, retrieval and display system according to claim 1 further comprising a card reader coupled to said controller.

6. A high speed storage, retrieval and display system according to claim 1 further comprising a line printer coupled to said controller.

7. A high speed storage, retrieval and display system according to claim 1 further comprising:

means for capturing graphic data on microfilm for subsequent storage in one of said cartridges;

means for recording digital index data corresponding to the captured graphic data, said recorded digital index data for subsequent entry into said memory through said data capture unit and said controller; and a second communication keyboard for communicating said digital index data to said recording means, and for controlling said capturing means.

8. A high speed storage, retrieval and display system according to claim 7, wherein said digital index data is recorded simultaneously with the capturing of said graphic data.

9. A high speed storage, retrieval and display system according to claim 7 further including means for automatically capturing said index marks and said first, second and third addresses simultaneously with capturing said graphic data.

10. A high speed storage, retrieval and display system according to claim 7 wherein said graphic capturing means comprises:

a camera coupled to and controlled by said second communication keyboard; and a platen for supporting a source document page to be graphically captured on microfilm.

11. A high speed storage, retrieval and display system according to claim 10 wherein said platen includes a permanent index mark which is graphically captured simultaneously with said source document page.

12. A high speed storage, retrieval and display system according to claim 10 wherein said platen includes means for displaying said first, second and third addresses for graphic capture with said source document page.

13. A high speed storage, retrieval and display system according to claim 12 wherein said displaying means are numeric counters which are automatically incremented under the control of said second communication keyboard.

14. A high speed storage, retrieval and display system according to claim 7 wherein said recording means comprises a magnetic tape recorder coupled to said second communication keyboard.

15. A high speed storage, retrieval and display system for graphic data comprising:

source documents disposed on strips of microfilm containing along the lengths thereof a plurality of image frames;

a plurality of microfilm cartridges for housing said strips, wherein the contents of each of said image frames comprises a source document and a source document address in graphic form;

a plurality of rotatable supports for storing thereon a plurality of said microfilm cartridges, each of said supports divided into sectors and each sector storing one of said cartridges, each support having assigned thereto a first address and each sector having assigned thereto a second address such that the location of each of said plurality of cartridges is defined by said first address and second address, each image frame in each cartridge being defined by a third address, the combination of said first, second and third address forming said source document address which defines the location of a particular one of said plurality of image frames;

a display station;

a first communication keyboard through which said source document address is entered;

means responsive to said first and second addresses for automatically retrieving and transporting a particular one of said plurality of cartridges to said display station;

means responsive to said third address for locating a particular one of said plurality of image frames in the retrieved cartridge;

an optical projection system at said display station for displaying the contents of said particular one of said plurality of image frames, said contents representing the desired source document and including its source document address;

means for providing a hard copy of said contents;

a memory for storing digital index data describing source documents and for correlating said digital index data with said first, second and third addresses;

a controller coupled to said memory for controlling the operation thereof and the entry of said digital index data, said memory accessed from said keyboard through said controller; and a first magnetic tape recorder operating in the read mode and coupled to said controller for supplying said memory with said digital index data.

16. A high speed storage, retrieval and display system for graphic data comprising:

source documents disposed on strips of microfilm containing along the lengths thereof a plurality of image frames;

a plurality of microfilm cartridges for housing said image frames, wherein the contents of each of said image frames comprises a source document and a source document address in graphic form, said source document address defining the location of its corresponding image frame within said system;

a plurality of rotatable supports for storing thereon a plurality of said microfilm cartridges, each of said supports divided into sectors and each sector storing one of said cartridges, each support having assigned thereto a first address and each sector having assigned thereto a second address such that the location of each of said plurality of cartridges is defined by said first address and second address, each image frame in each cartridge being defined by a third address, the combination of said first, second and third address forming the source document address which defines the location of a particular one of said plurality of image frames;

a display station;

a first communication keyboard through which said source document address is entered;

means responsive to said first and second addresses for automatically retrieving and transporting a particular one of said plurality of cartridges to said display station;

means responsive to said third address for locating a particular one of said plurality of image frames in the retrieved cartridge;

an optical projection system at said display station for displaying the contents of said particular one of said plurality of image frames, said contents representing the desired source document and including its source document address;

means for providing a hard copy of said contents;

a memory for storing digital index data describing source documents and for correlating said digital index data with said first, second and third addresses;

a controller coupled to said memory for controlling the operation thereof and the entry of said digital index data, said memory accessed from said keyboard through said controller;

a first magnetic tape recorder operating in the read mode and coupled to said controller for supplying said memory with said digital index data;

means for capturing graphic data, including said first, second and third addresses, on microfilm for subsequent storage in one of said cartridges;

means for recording digital index data describing the captured graphic data, said recorded digital index data for subsequent entry into said memory through said first magnetic tape recorder; and a second communication keyboard for communicating said digital index data to said recording means and for controlling said capturing means.

* * * * *